United States Patent [19]

La Rocca

[11] Patent Number: 5,618,453
[45] Date of Patent: Apr. 8, 1997

[54] COMBINED CUTTING AND WELDING METHOD AND RELATIVE APPARATUS FOR MANUFACTURING STRUCTURAL SHEET METAL PRODUCTS

[75] Inventor: Aldo V. La Rocca, Moncalieri, Italy

[73] Assignee: Lara Consultants S.r.l., Moncalieri, Italy

[21] Appl. No.: 374,583

[22] PCT Filed: Jul. 23, 1993

[86] PCT No.: PCT/IT93/00083

§ 371 Date: Mar. 10, 1995

§ 102(e) Date: Mar. 10, 1995

[87] PCT Pub. No.: WO94/02281

PCT Pub. Date: Feb. 3, 1994

[30] Foreign Application Priority Data

Jul. 24, 1992 [IT] Italy ................ TO92A0639

[51] Int. Cl.⁶ ............ B23K 28/02; B23K 26/08; B23K 37/04
[52] U.S. Cl. ............ 219/121.63; 219/121.64; 219/121.67; 219/121.82; 228/170; 29/897.35
[58] Field of Search ............ 219/101, 104, 219/105, 121.63, 121.64, 121.67, 121.68, 121.69, 121.76, 121.82, 121.85; 228/44.3, 170, 182, 184, 212; 29/897.31, 897.32, 897.33, 897.35

[56] References Cited

U.S. PATENT DOCUMENTS

| | | | |
|---|---|---|---|
| 3,164,713 | 1/1965 | Banks et al. | 219/124 |
| 3,755,647 | 8/1973 | Pierart | 228/182 |
| 4,227,065 | 10/1980 | Paradi et al. | 219/121.64 |
| 4,229,641 | 10/1980 | Ihara | 219/125.1 |
| 4,487,356 | 12/1984 | Krieger et al. | 228/46 |
| 4,807,797 | 2/1989 | West | 228/175 |
| 4,993,619 | 2/1991 | Kresse et al. | 228/212 |
| 5,023,427 | 6/1991 | Neiheisel et al. | 219/121.82 |

FOREIGN PATENT DOCUMENTS

| | | |
|---|---|---|
| 676414 | 8/1966 | Belgium . |
| 2458656 | 6/1976 | Germany . |
| 60-96386 | 5/1985 | Japan . |
| 92/05895 | 4/1992 | WIPO . |

*Primary Examiner*—Teresa J. Walberg
*Assistant Examiner*—J. Pelham
*Attorney, Agent, or Firm*—Leydig, Voit & Mayer, Ltd.

[57] ABSTRACT

A method of manufacturing structural sheet metal products whereby a number of portions of sheet metal are fed simultaneously along concurrent planes so that the leading edge of one portion cooperates with a face of an adjacent portion along the plane of contact between the two portions; respective sheets are cut simultaneously off the portions; and the sheets are welded together along the respective planes of contact; cutting and welding being performed using laser heads.

34 Claims, 6 Drawing Sheets

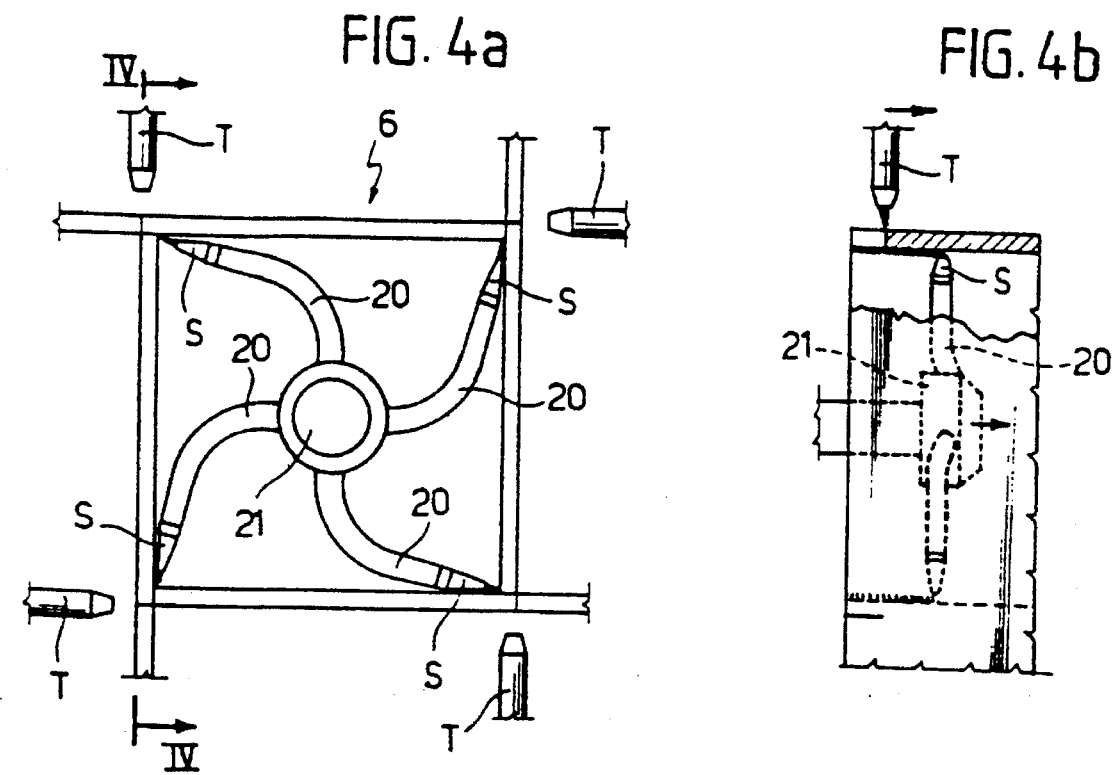
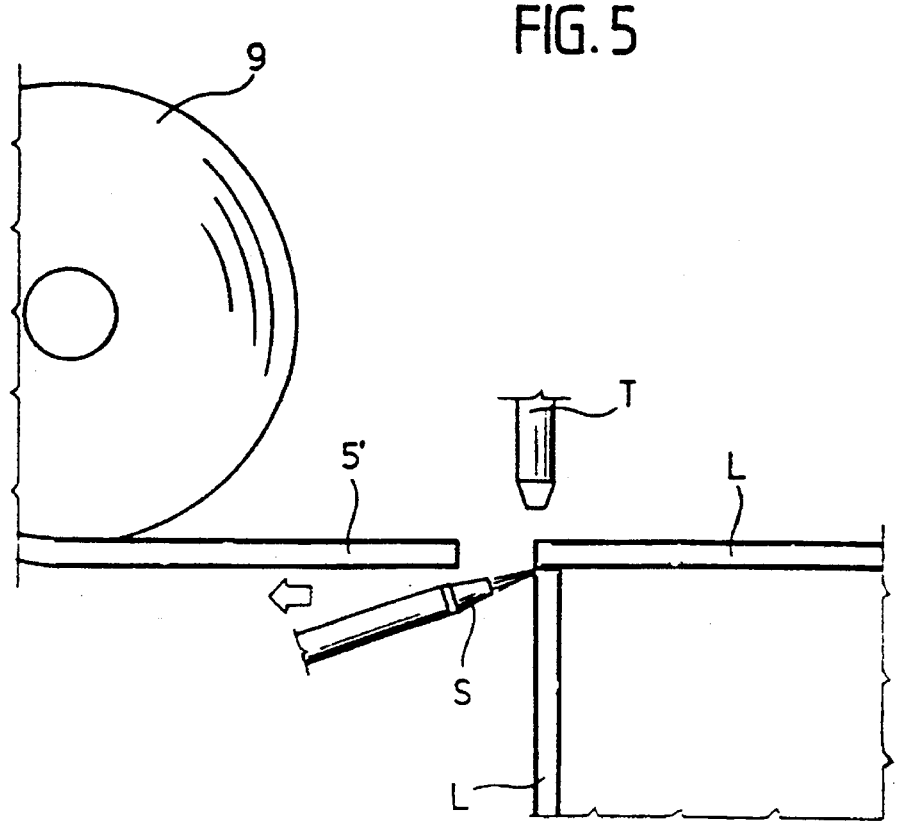

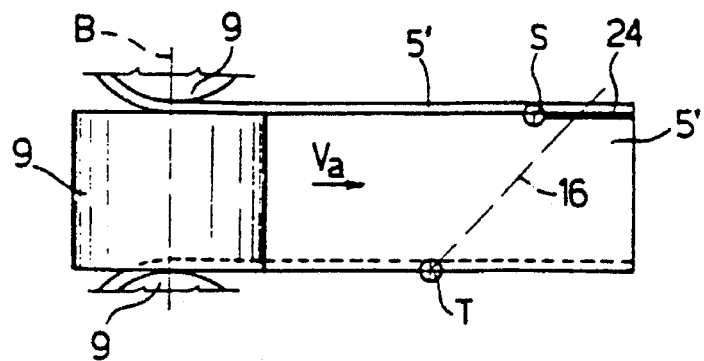
FIG. 8a
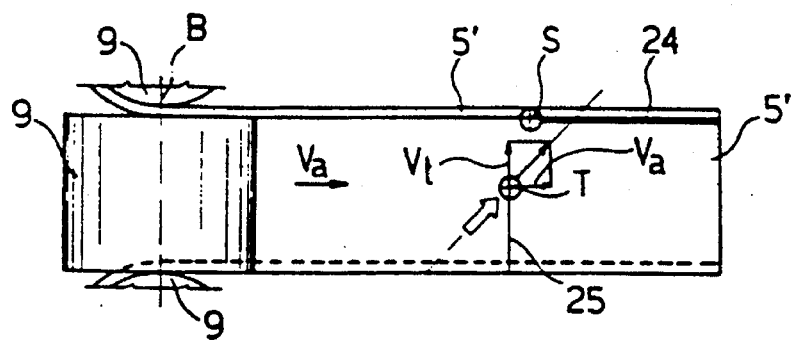
FIG. 8b
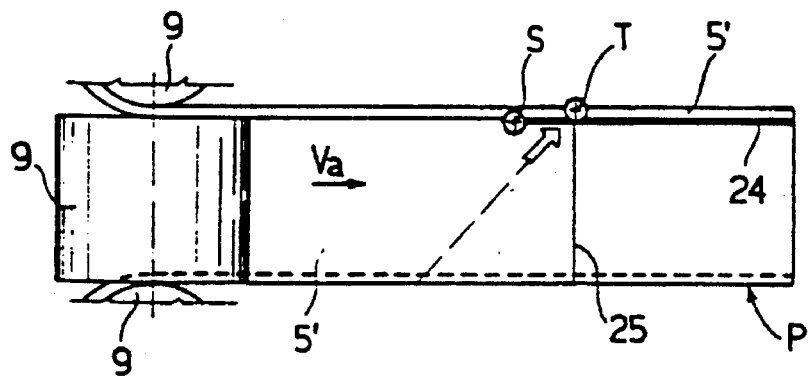
FIG. 8c
FIG. 8d
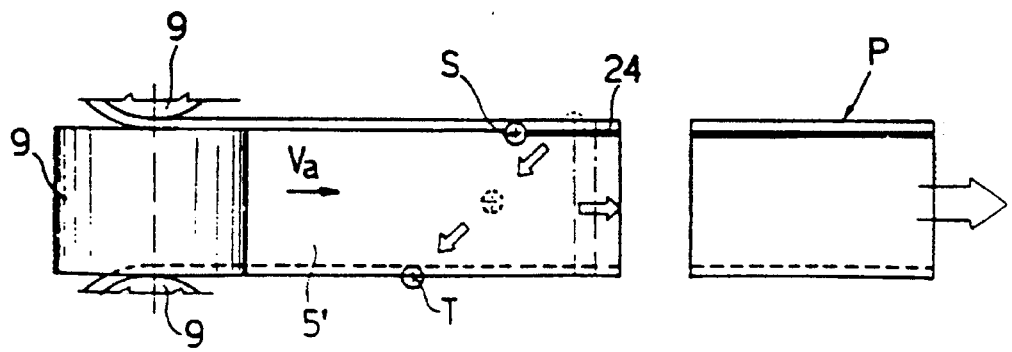

COMBINED CUTTING AND WELDING METHOD AND RELATIVE APPARATUS FOR MANUFACTURING STRUCTURAL SHEET METAL PRODUCTS

TECHNICAL FIELD

The present invention relates to a method and relative apparatus for manufacturing structural sheet metal products by means of combined, preferably laser cutting and welding operations.

BACKGROUND ART

Structural products with a closed polygonal section (e.g. rectangular box sections) or such as to present a high degree of rotational inertia (section irons) are widely used in various fields of industry for achieving a high degree of flexural and torsional rigidity.

Depending on the geometry of the finished product and the type and thickness of the material employed, such products are normally manufactured using conventional permanent deformation (pressing, bending) or extrusion techniques.

A drawback common to all the above techniques is the high cost of the tooling involved, which not only affects the price of the finished product, but also poses problems in terms of flexibility, by virtue of production machinery never, as a rule, being replaced until it is entirely written off.

In the case of permanent deformation techniques (pressing and bending), the severe stress required for achieving a high degree of local deformation (as when deep-drawing sharp edges, etc.) invariably results in springback of the material whereby, upon removal of stress, the pressed or bent part springs back to a different shape from that assumed under stress.

Dimensional inaccuracy resulting from springback of the material is especially noticeable when sheet metal parts produced using traditional permanent deformation techniques are welded, e.g. spot welded, to another part, in which case, any dimensional inaccuracy is counteracted by maintaining the two parts under stress and contacting each other. When stress is removed, however, the welded parts tend to return to their original shape, thus subjecting the weld spots to internal stress which remains throughout the working life of the assembled structure, and which, especially in the case of structures subjected repeatedly to pulsating stress (e.g. vehicles), results, at least macroscopically speaking, in sudden failure of the weld spots, which "spreads domino fashion" from one spot to another along the weld line, with catastrophic consequences to the structure as a whole.

The above defect, which is partly due to traces of oil in the liquefied material during welding, and to metallurgical irregularities and microcracks produced when the oil vaporizes, has partly been solved by pickling prior to welding. In addition to only partly solving the problem, however, pickling adds even further to the already high direct and indirect cost of conventional methods.

The above defect is also caused by electrolytic erosion resulting from moisture, water or dirt accumulating, with the aid of capillary attraction, in the weld spot region.

Extrusion processes also present several drawbacks, foremost of which are high cost, also in terms of energy consumption, and the invariably poor finish of the end product. Moreover, extrusion processes are limited to certain materials and to a very small range of shapes and sizes.

Traditional techniques for the manufacture of structural products thus leave ample scope for improvement.

DISCLOSURE OF INVENTION

It is an object of the present invention to provide a method of manufacturing structural sheet metal products, designed to overcome the drawbacks typically associated with the aforementioned known techniques.

According to the present invention, there is provided a method of manufacturing structural sheet metal products, characterized by the fact that it comprises at least the following stages, wherein:

a) at least two portions of respective continuous strips of sheet metal are fed simultaneously along respective concurrent planes;

b) a sheet is cut simultaneously off each of said portions;

c) said sheets are welded together substantially along the plane of contact.

It is a further object of the present invention to provide an apparatus for implementing the above method.

According to the present invention, there is also provided an apparatus for manufacturing structural sheet metal products, characterized by the fact that it comprises:

means for supporting and guiding said sheet metal and defining at least two concurrent planes;

means for simultaneously feeding at least two portions of respective continuous strips of sheet metal along said respective planes;

means for cutting respective sheets off said portions of sheet metal;

means for welding said sheets together substantially along the plane of contact.

BRIEF DESCRIPTION OF DRAWINGS

A number of preferred embodiments of the present invention will be described by way of example with reference to the accompanying drawings, in which:

FIG. 4a shows a schematic front view of one stage in the operation of a detail in a further embodiment of the apparatus according to the present invention;

FIG. 4b shows a section along line IV—IV in FIG. 4a;

FIG. 5 shows a schematic front view of a detail in a further embodiment of the apparatus according to the present invention;

FIGS. 8a, 8b, 8c and 8d show schematic side views of successive operating stages of the FIGS. 6 and 7 apparatus.

BEST MODE FOR CARRYING OUT THE INVENTION

Figure 1:
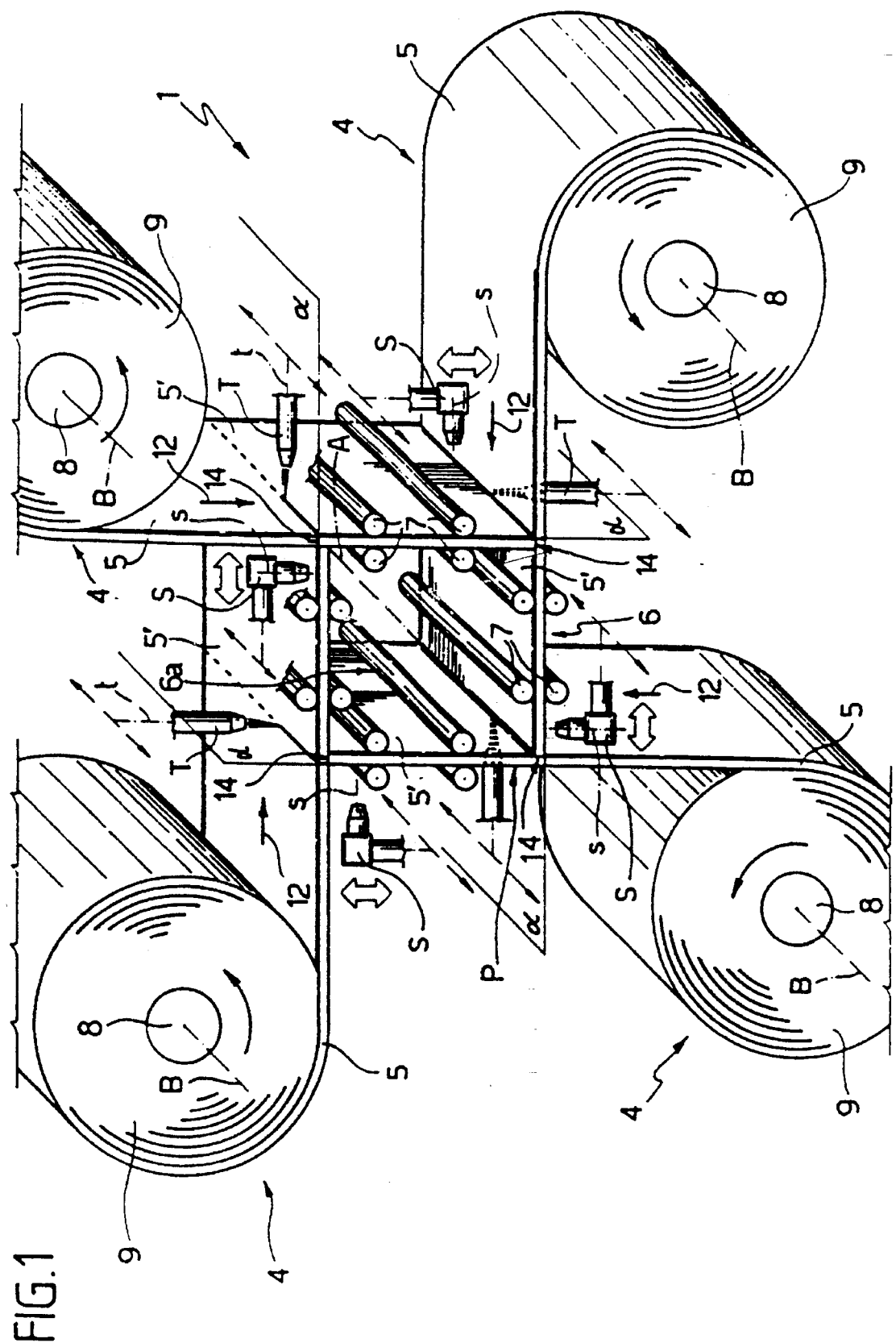
FIG. 1 shows a partial schematic view in perspective of an apparatus for manufacturing structural sheet metal products in accordance with the teachings of the present invention.
Figure 2:
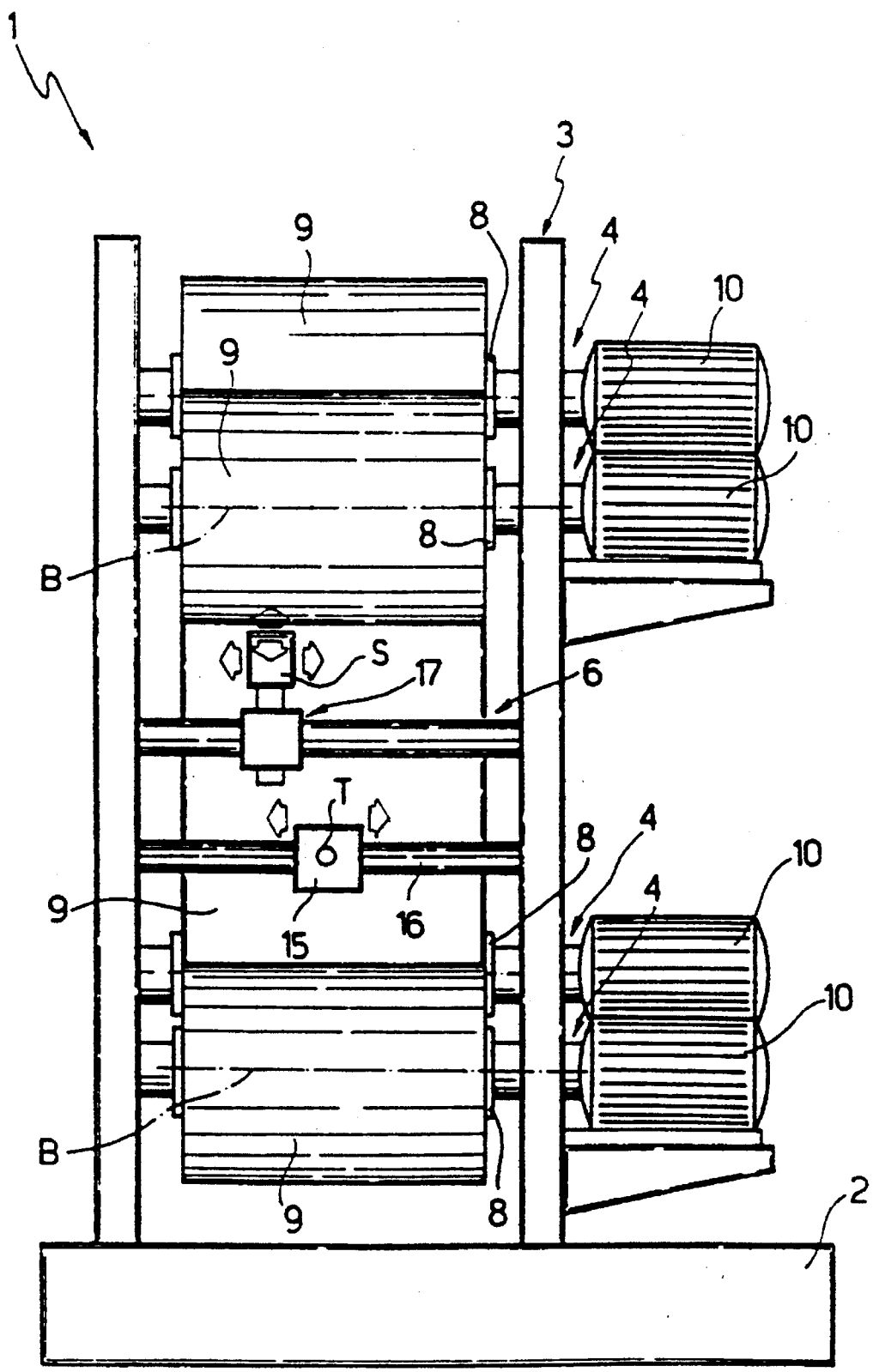
FIG. 2 shows a schematic side view of the FIG. 1 apparatus.

Number 1 in FIGS. 1 and 2 indicates an apparatus for manufacturing structural sheet metal products, in particular, hollow, square-section products P.

Apparatus 1 (FIG. 2) comprises a base 2, and a supporting structure 3 anchored to base 2 and supporting four devices 4 for feeding respective sheet metal strips 5 to a work station 6.

Work station 6 in turn comprises a workholder unit 6a supported on structure 3 and having a number of known means 7 for guiding strips 5 and consisting, for example, of rollers supported on structure 3. Guide means 7 define respective planes α along which strips 5 are fed in twos parallel to and facing each other, and which define a square-section parallelepipedon having an axis A and substantially the same section as finished products P.

More specifically, each feed device 4 comprises a drum 8 rotating about a horizontal axis B parallel to axis A, and on which is mounted a respective roll 9 of strip metal; and a reversible motor 10 connected angularly to drum 8 and rotating it in such a manner as to unwind or rewind roll 9. Drums 8 and respective motors 10 are supported on structure 3.

The strip portions 5' wound off respective rolls 9 are guided by means 7 and fed along respective planes α tangentially in relation to axis A, as shown by arrows 12 in FIG. 1. Said feed directions define an ideal direction of rotation about axis A, as shown by arrow 13 in FIG. 3a, so that the leading edge 14 of each strip portion 5' wound off one roll 9 contacts portion 5' wound off the downstream roll 9 (in said ideal rotation direction). In the following description, "upstream" and "downstream" in connection with portions 5' of strips 5 (or the faces of finished product P) are to be understood as referring to said ideal rotation direction.

Moreover, for the sake of clarity, planes α referred to in the following description are those of the faces of portions 5' facing away from axis A (i.e. the outside faces of finished product P).

The work station substantially comprises four laser cutting heads T and four laser welding heads S, each of which provides for focusing a respective laser beam supplied by a respective known laser source (not shown).

Each cutting head T presents its optical axis t perpendicular to plane α of a respective portion 5' and lying in plane α of upstream portion 5', and is mounted on a slide 15 (FIG. 2) running along a respective slideway 16 integral with structure 3, so as to move the optical axis of head T parallel to itself and along said plane α.

Each welding head S presents its optical axis s perpendicular to plane α of a respective portion 5', and is conveniently mounted on a two-axis cartesian robot 17 (FIG. 2) by which it is moved between a first withdrawn idle position (FIGS. 1 and 3a) and an operating position (FIG. 3b) wherein optical axis s lies in the plane of contact between respective portion 5' and downstream portion 5', and wherein robot 17 also provides for moving head S parallel to axis A and so moving optical axis s along said plane of contact.

Being cutting heads, heads T must be provided with means for gas shielding the cutting area, e.g. oxygen supply means when cutting ferrous sheet metal. Such means, which do not form part of the present invention and are therefore not shown or described in detail, may be of any known type, and are preferably as described in Italian Patent Application n. T091A000949 entitled "Laser cutting gas shielding method and relative cutting apparatus", filed on 6 Dec. 1991, and the content of which is included herein purely by way of reference as required.

Being welding heads, heads S must be provided with means for gas shielding the welding area, e.g. helium supply means. Such means, which do not form part of the present invention and are therefore not shown or described in detail, may be of any known type, and are preferably as described in Italian Patent Application n. T091A000933 entitled "Laser gas shielding method and device", filed on 29 Nov. 1991, and the content of which is included herein purely by way of reference as required.

Figure 3B:
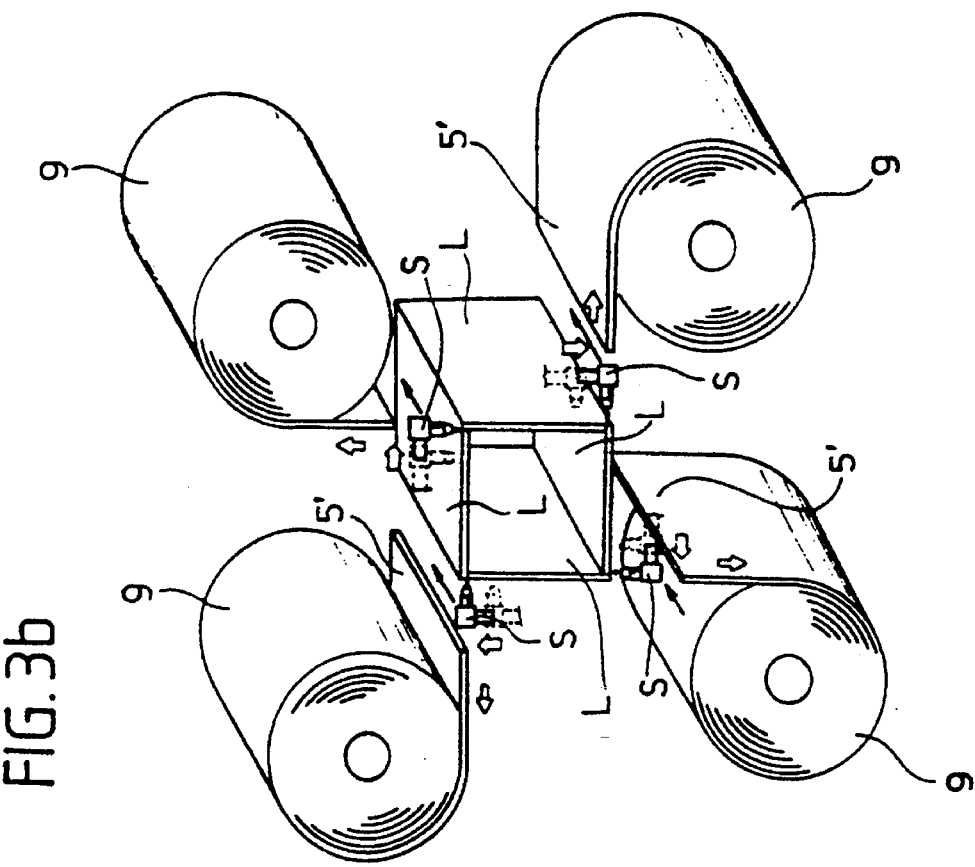
FIGS. 3a and 3b show schematic views in perspective of successive stages in the manufacture of a square-section product according to the present invention.
Figure 3A:
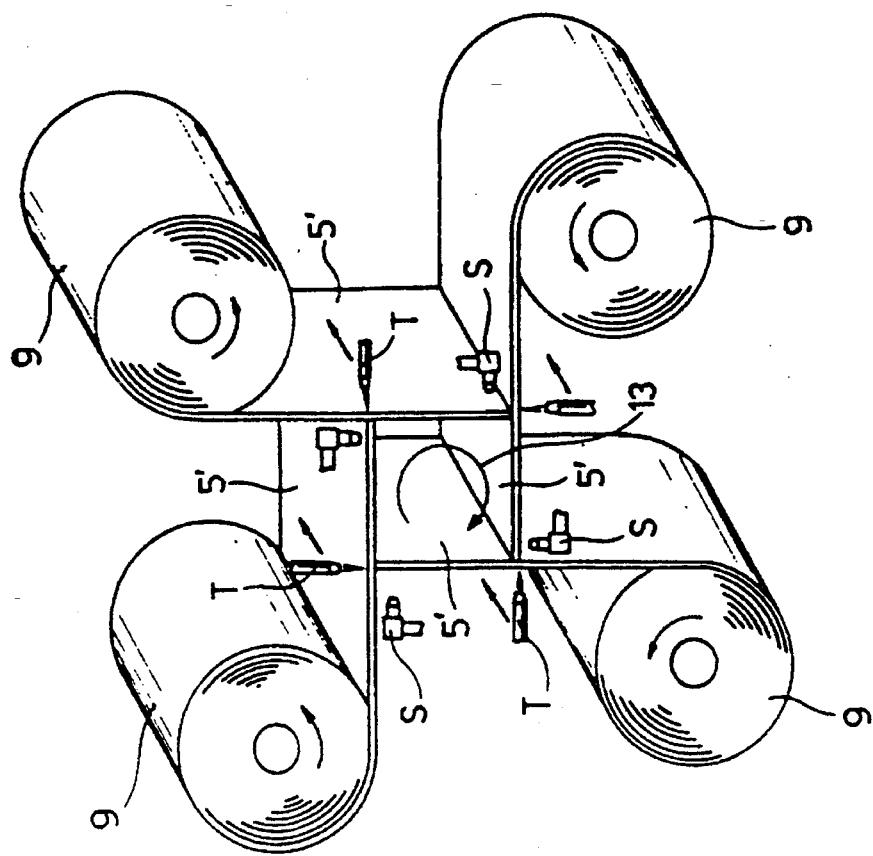

FIGS. 3a and 3b show successive stages in the manufacture of product P.

At the start of the cycle, laser heads T and S are located at respective lateral edges of portions 5', and all on the same side in relation to strips 5.

In the first stage (FIG. 3a), rolls 9 are unwound so as to feed portions 5' along respective planes α and into contact with respective downstream portions 5', at which point, motors 10 powering drums 8 are stopped.

In the next stage (also shown in FIG. 3a, though subsequent to the previous stage), laser heads T are activated and moved simultaneously along respective slideways 16, so as to cut a respective sheet L off each portion 5', which sheet L is retained in workholder unit 6a by known, e.g. pneumatic or magnetic, clamping means (not shown). To avoid non-productive travel of laser heads T after cutting off sheets L, heads T remain stationary at the opposite edge of strips 5 pending the next cycle, in which the cutting operation is conveniently performed in the opposite direction.

At this point, drums 8 are reversed so as to back up the leftover portions 5' and so enable laser heads S to be moved into the operating position (FIG. 3b) wherein heads S are activated and moved by robots 17 along the respective planes of contact between sheets L, which are thus welded together.

Upon release of the means clamping sheets L in workholder unit 6a, finished product P may be expelled axially with the aid of known means (not shown).

FIGS. 4a and 4b show a variation of work station 6 and the relative method, wherein laser cutting heads T are identical to those described above, while laser welding heads S are considerably smaller, are housed inside workholder unit 6a (not shown), and are connected to a laser source (not shown) by respective light guides 20. Heads S are positioned facing the respective planes of contact between portions 5', are maintained at an angle of conveniently 14° or less in relation to said planes, and are connected rigidly to a central actuator 21 by which they are moved simultaneously along axis A. Workholder unit 6a conveniently presents guide means (not shown) for maintaining heads S in the correct position as they are moved along axis A.

The method described with reference to FIGS. 3a and 3b may thus be simplified considerably in the sense that rolls 9 need no longer be rewound partially for moving heads S into the operating position; heads S are moved along a single axis parallel to the axis of travel of heads T; and heads T and S may be operated simultaneously for enabling simultaneous cutting and welding. As shown in FIG. 4b, cutting head T should follow welding head S, for ensuring sheet L is detached from respective portion 5', in the event the strips are not rewound.

FIG. 5 shows a variation of work station 6 wherein laser heads S are located outside workholder unit 6a (not shown), are positioned facing the respective planes of contact between portions 5', and are inclined at an angle of 14° or less as in the previous case. The method is identical to that described with reference to FIGS. 3a and 3b, except that, by virtue of the small size and arrangement of heads S, these need no longer be moved into position beforehand, and may thus be moved along a single axis. If welding is performed prior to cutting, as shown in FIGS. 4a and 4b, rewinding of the strip may also be dispensed with in the FIG. 5 work station.

Figure 7:
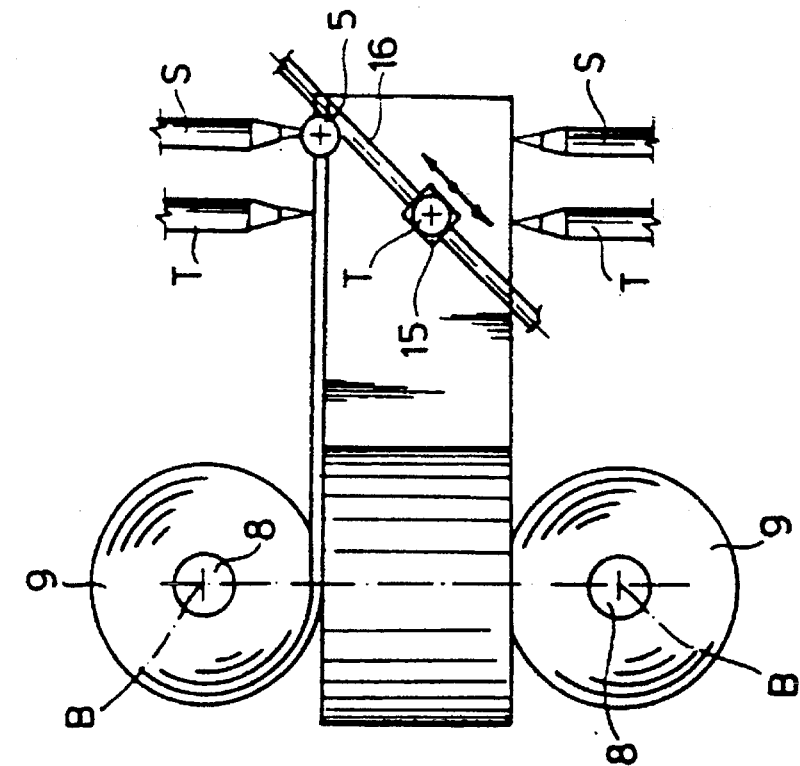
FIGS. 6 and 7 show partial schematic front and side views respectively of a further embodiment of the apparatus according to the present invention.
Figure 6:
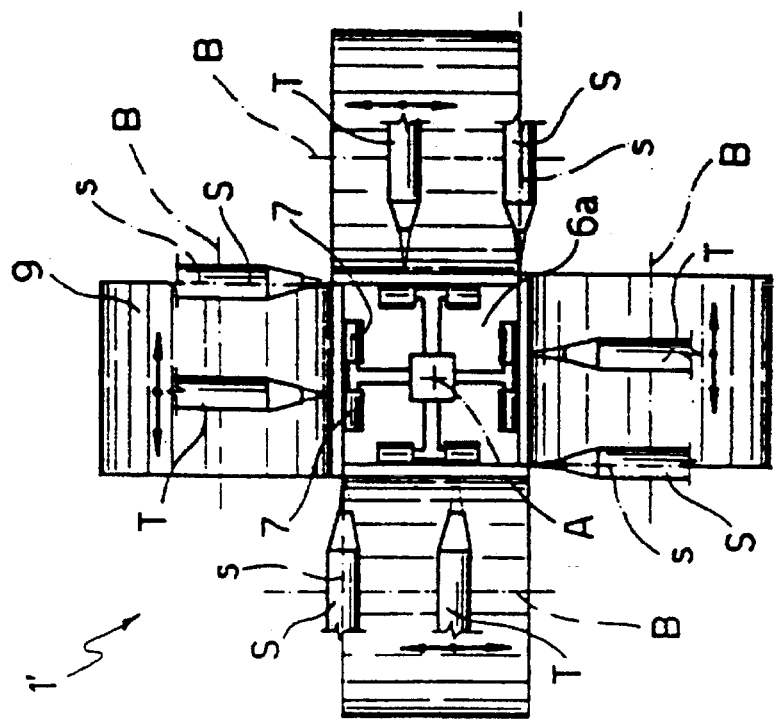

Number 1' in FIGS. 6 and 7 indicates a further embodiment of the apparatus according to the present invention, and which is described below insofar as it differs from apparatus 1. Any parts identical or corresponding to those already described in connection with apparatus 1 are indicated using the same numbering system.

Apparatus 1' differs from 1 in that the sheet metal is fed axially as opposed to tangentially on to workholder unit 6a. That is, drums 8 on to which rolls 9 are mounted are positioned with their respective axes in the same plane, facing each other in twos so as to form a square in said plane, and perpendicular to axis A which, in said plane, defines the center of the square.

Drums 8 (motors 10 of which are not shown for the sake of simplicity) are located a given axial distance from workholder unit 6a so that portions 5' wound off respective rolls 9 are fed continuously and axially along respective planes α defined by guide means 7 with which workholder unit 6a is provided.

Portions 5' are so guided as to be positioned mutually as described in connection with apparatus 1, when viewed in cross section in a plane perpendicular to axis A in the direction of which portions 5' are fed. More specifically, each portion 5' travels along a respective plane α defined by workholder unit 6a, and cooperates laterally with the edge of the face of an adjacent portion 5'.

Apparatus 1' also comprises four cutting heads T and four welding heads S.

By virtue of the sheet metal being fed axially, heads S may be fixed, each with its optical axis s perpendicular to a respective portion 5' and lying in the plane of contact between said portion 5' and the adjacent one. As such, by continuously feeding the sheet metal at an appropriate speed $v_a$ along workholder unit 6a, heads S provide for continuously welding portions 5' and so forming a square box type section from strips 5.

Heads T provide for cutting respective portions 5', i.e. the walls of the box section, and so cutting the section into axial lengths. For enabling cutting to be performed continuously, heads T are conveniently mounted on respective slides 15 running along respective slideways 16 facing respective planes α and inclined (FIGS. 7 and 8a–8d) in relation to the traveling direction of portions 5'. Said inclination is so calculated that slides 15 travel along slideways 16 with an axial speed component (i.e. parallel to axis A) equal to the traveling speed $v_a$ of the sheet metal, and with a transverse speed component $v_t$ equal to the cutting speed. As such, the cutting motion (FIGS. 8b–8d) consists in straightforward translational motion perpendicular to the traveling direction of the sheet metal, so that the box section is cut square. Slideways 16 are so arranged that, at the end of the cutting stroke, each head T is positioned ahead of head S operating on the same face of the box section, thus ensuring the work is detached by also cutting through the weld.

The operating cycle of apparatus 1' will now be described with reference to FIGS. 8a–8d and to laser heads S and T operating on one face of the box section, which considerations obviously also apply to the other heads.

FIG. 8a shows the operating condition at the start of the cycle, wherein head T is located at the free lateral edge of pot%ion 5' (i.e. the edge opposite the one cooperating with the adjacent portion 5'), and the sheet metal has been fed past head T by an axial length equal to the required length of product P. The axial location of fixed head S may be selected relatively freely, providing it is upstream in relation to slideway 16 (shown by the dot-and-dash line) and, being operated continuously, has thus already effected a first portion of weld 24, as described later on.

As of the above start position, head T is activated and moved by slide 15 along slideway 16 (FIG. 8b) at the aforementioned speed, so as to effect, for the reasons already stated, a cut 25 perpendicular to the traveling direction of the sheet metal. Upon head T reaching the opposite edge of the box section (FIG. 8c), cut 25 is completed and merges with the cut made by another head T in the adjacent face of the box section.

Product P may then be expelled axially, and head T reset at high speed to the cycle start position (FIG. 8d). At the same time, the sheet continues moving forward continuously, and heads S commence welding the next piece. Upon the sheet being fed past the idle position of heads T by an amount equal to the required length of product P, the cycle is repeated as described above.

The advantages of apparatus 1 and 1' according to the present invention, and of the methods implemented by the same, will be clear from the foregoing description.

In particular, they provide for eliminating any form of permanent deformation and, consequently, any stress, particularly springback, induced thereby in the material. When performed properly, laser cutting and welding induce negligible stress and strain in the sheet metal, and provide for manufacturing products to a high degree of geometrical precision and practically free of internal stress. Moreover, laser welding provides for achieving joints of even greater strength as compared with the base material, i.e. the same material subjected to other than laser processing, so that the mechanical characteristics of the finished product are not only equivalent but even superior to those of similar products manufactured using traditional techniques.

Extremely high production speeds are achieved by simultaneously feeding the sheet portions constituting the faces of the finished product, and particularly in the solutions described wherein said portions are fed continuously.

Laser welding provides for troublefree welding of materials, such as certain types of stainless steel, that are notoriously difficult to weld using traditional techniques.

Finally, the tooling involved is drastically cheaper as compared with traditional methods, in addition to providing for a high degree of versatility in terms of production.

To those skilled in the art it will be clear that changes may be made to the methods and apparatuses as described and illustrated herein without, however, departing from the scope of the present invention.

In particular, open-section or prismatic products of any polygonal section may be formed using a number of strips equal to the number of faces of the finished product, and by appropriately guiding the portions wound off the strips so that they travel tangentially in relation to the axis of the product (using an apparatus similar to apparatus 1) or parallel to said axis (using an apparatus similar to apparatus 1').

In the case Of apparatus 1', if continuous feed of the sheet is not required, cutting heads T may be dispensed with, and welding heads S replaced by multipurpose heads also designed for cutting. In this case, with the work stationary, and after welding two adjacent faces, each multipurpose head may be so operated as to cut a respective face, either perpendicular to the traveling direction, or in a convenient inclined direction, depending on how the product is to be employed.

Inclined cutting may also be achieved with the work fed continuously as described in connection with apparatus 1', by appropriately varying the speed of the cutting heads, and more specifically, by varying the component of said speed parallel to the axis of the work in relation to the traveling speed of the sheet.

In any case, changes may be made to the type, number, arrangement and operation of the laser heads, as well as to the manner in which the sheet is fed, depending on the output required and for maximizing efficiency, i.e. minimizing downtime, of the laser heads.

Moreover, open sections may be produced by omitting one or more faces of a corresponding polygonal section; and, finally, the finished product may be cut longitudinally or obliquely for producing two or more semifinished products of given geometry.

I claim:

1. A method of manufacturing structural sheet metal products, comprising at least the following operations repeated cyclically:

a) at least two portions (5') of respective continuous strips (5) of sheet metal are fed simultaneously along respective concurrent planes ($\alpha$);

b) a sheet (L) is cut simultaneously off each of said sheets (L);

c) said portions (5') are welded together substantially along a plane of contact; wherein said cutting and welding operations are performed using laser means (T,S).

2. A method as claimed in claim 1 for manufacturing box type sections (P), including a number of mutually-cooperating portions (5') defining a closed polygonal cross section; each portion (5') defining a respective face of said section (P).

3. A method as claimed in claim 2, including a laser cutting head (T) for each said portion (5'), and a laser welding head (S) for each plane of contact between said portions (5').

4. A method as claimed in claim 1, wherein said plane of contact is defined by a front edge (14) of one said portion (5') and by a face of another said portion (5') cooperating with said edge (14).

5. A method as claimed in claim 1, including an operation wherein a traveling direction of said portions (5') is reversed following said cutting operation.

6. A method as claimed in claim 5, including an operation wherein said laser welding heads (S) are moved from a first withdrawn position to a second position wherein the respective optical axes (s) of said welding heads (S) lie in said planes of contact between said portions (5').

7. A method as claimed in claim 4, wherein said welding and cutting operations are performed simultaneously, and said laser welding heads (S) and said laser cutting heads (T) travel in the same direction.

8. A method as claimed in claim 7, wherein said welding heads (S) travel ahead of said cutting heads (T).

9. A method as claimed in claim 1, wherein said plane of contact is defined by a lateral end surface of one said portion (5') and by a longitudinal edge of one face of another said portion (5') cooperating with said lateral surface.

10. A method as claimed in claim 9, wherein said portions (5') are fed continuously.

11. A method as claimed in claim 10, wherein said cutting and welding operations are performed as said portions (5') are fed forward.

12. A method as claimed in claim 10, wherein during said cutting operation, said laser cutting heads (T) are moved in a direction oblique to a traveling direction of respective said portions (5').

13. A method as claimed in claim 12, wherein during said cutting operation, said laser cutting heads (T) are moved in said oblique direction at a speed the component of which parallel to the traveling direction of respective said portions (5') is equal to the traveling speed ($v_a$) of said portions (5').

14. A method as claimed in claim 9, wherein said portions (5') are fed forward in discrete steps; each said cutting operation being performed subsequent to said forward feed movement.

15. A method as claimed in claim 14, wherein said welding operation is performed as said portions (5') are fed forward.

16. A method as claimed in claim 14 wherein said welding and cutting operations are performed using a single multipurpose laser head for each face of said portions.

17. An apparatus (1, 1') for manufacturing structural sheet metal products, comprising:

means (6a, 7) for supporting and guiding said sheet metal and defining at least two concurrent planes (a);

means (4) for simultaneously feeding at least two portions (5') of respective continuous strips of sheet metal along said respective planes (a);

laser means (T) for simultaneously cutting respective sheets (L) off said at least two portions (5') of sheet metal; and laser means (S) for welding said sheets (L) together substantially along a plane of contact.

18. An apparatus as claimed in claim 17, wherein said cutting means comprise at least one laser head (T).

19. An apparatus as claimed in claim 17, wherein said welding means comprise at least one laser head (S).

20. An apparatus as claimed in claim 17, including means (4) for feeding and means (6a, 7) for supporting and guiding a number of said portions (5') cooperating mutually and defining, in cross section, a closed polygon; each said portion (5') defining a respective face of said product (P).

21. An apparatus as claimed in claim 19, including a laser cutting head (T) for each said portion (5'), and a laser welding head (S) for each plane of contact between said portions (5').

22. An apparatus as claimed in claim 17, wherein said feed means (4) comprise a number of rotary drums (8) on to which are mounted respective rolls (9) of metal strip (5) off which said portions (5') are unwound; and respective electric motors (10) connected angularly to said drums (8).

23. An apparatus as claimed in claim 17, wherein said plane of contact is defined by a front edge (14) of one said portion (5') and by a face of another said portion (5') cooperating with said edge (14).

24. An apparatus as claimed in claim 23, including first means (17) for moving said laser welding heads (S) along said respective planes of contact; and means (15) for moving said laser cutting heads (T) along respective cutting planes.

25. An apparatus as claimed in claim 24, including second means (17) for moving said laser welding heads (S) between a first withdrawn idle position and a second position wherein the respective optical axes (s) of said laser welding heads (S) lie in said planes of contact between said portions (5').

26. An apparatus as claimed in claim 24, wherein said first means (17) for moving said laser welding heads (S) and said means (15) for moving said laser cutting heads (T) provide respectively for moving said welding heads (S) and said cutting heads (T) in the same direction along said respective planes.

27. An apparatus as claimed in claim 26, wherein said welding heads (S) travel ahead of said cutting heads (T).

28. An apparatus as claimed in claim 17, wherein said plane of contact is defined by a lateral end surface of one said portion (5') and by a longitudinal edge of one face of another said portion (5') cooperating with said lateral surface.

29. An apparatus as claimed in claim 28, wherein said feed means (4) provide for continuously feeding said portions (5').

30. An apparatus as claimed in claim 28, wherein said means for moving said cutting heads (T) comprise means (16) for guiding said cutting heads (T) oblique to a traveling direction of respective said portions (5').

31. An apparatus as claimed in claim 30, wherein said means (15) provide for moving said laser cutting heads (T) along said guide means (16) at speed the component of which parallel to the traveling direction of said respective portions (5') is equal to the traveling speed ($v_a$) of said portions (5').

32. An apparatus as claimed in claim 28, wherein said feed means (4) provide for feeding said portions (5') in discrete steps.

33. An apparatus as claimed in claim 32, including a single multipurpose laser head for each face of said section (P).

34. An closed polygonal sheet metal section produced by a process comprising the following steps:

a) feeding simultaneously along respective concurrent planes at least two portions of sheet metal;

b) cutting a sheet simultaneously off each of said portions using a laser beam; and c) welding together the sheets substantially along a plane of contact using a laser beam.

* * * * *